United States Patent
Daniel et al.

(10) Patent No.: US 11,384,958 B1
(45) Date of Patent: Jul. 12, 2022

(54) TANKLESS WATER HEATER WITH A HIGH-ACCURACY RESPONSE-CURVE FLOWMETER

(71) Applicant: Tankless Technologies, Inc., Scottsdale, AZ (US)

(72) Inventors: David M. Daniel, Phoenix, AZ (US); David A. Daniel, Scottsdale, AZ (US)

(73) Assignee: TANKLESS TECHNOLOGIES, INC., Scottsdale, AZ (US)

( * ) Notice: Subject to any disclaimer, the term of this patent is extended or adjusted under 35 U.S.C. 154(b) by 0 days.

(21) Appl. No.: 17/592,993

(22) Filed: Feb. 4, 2022

Related U.S. Application Data

(60) Provisional application No. 63/145,636, filed on Feb. 4, 2021.

(51) Int. Cl.
| | |
|---|---|
| *F24H 1/10* | (2022.01) |
| *F24H 15/238* | (2022.01) |
| *G01F 1/075* | (2006.01) |
| *G01F 1/08* | (2006.01) |

(52) U.S. Cl.
CPC .......... *F24H 1/101* (2013.01); *F24H 15/238* (2022.01); *G01F 1/075* (2013.01); *G01F 1/08* (2013.01)

(58) Field of Classification Search
None
See application file for complete search history.

(56) References Cited

U.S. PATENT DOCUMENTS

| | | | | |
|---|---|---|---|---|
| 3,759,100 | A * | 9/1973 | Medwig | G01F 1/08 73/861.87 |
| 3,822,591 | A * | 7/1974 | Li | G01F 15/02 73/239 |
| 4,551,612 | A * | 11/1985 | Sprague | F24H 1/181 122/19.2 |
| 5,072,416 | A * | 12/1991 | Francisco, Jr. | G01F 25/13 73/1.28 |
| 5,099,699 | A * | 3/1992 | Kobold | G01F 15/14 73/861.87 |
| 6,246,831 | B1 * | 6/2001 | Seitz | F24H 9/2021 219/483 |
| 6,644,133 | B2 * | 11/2003 | Williams | G01F 1/125 73/861.77 |
| 6,792,361 | B2 * | 9/2004 | Vun Cannon | G01F 25/10 702/46 |

(Continued)

*Primary Examiner* — Thor S Campbell
(74) *Attorney, Agent, or Firm* — Culhane Meadows PLLC; Robert C. Klinger

(57) ABSTRACT

A tankless water heater with an impeller flowmeter having multiple K factors significantly improving the accuracy of flowmeter readings, particularly at low water flow rates, such as under 1 gallon per minute. Rather than use a single K factor impeller flowmeter in a tankless water heater that is particularly inaccurate at low flow rates, this disclosure provides an impeller flowmeter with multiple K factors to obtain precise flow rate readings to precisely control heating of the water at low flow rates. The flowmeter has an onboard memory with multiple K factors stored for a controller to access and read. These multiple K factors are established for flowrates across the entire dynamic range of the flowmeter at the time it is manufactured. Just enough K factors are determined to provide good curve fitting. The flowmeter onboard memory is programmed with the multiple K factors.

14 Claims, 7 Drawing Sheets

(56) References Cited

U.S. PATENT DOCUMENTS

| | | | | |
|---|---|---|---|---|
| 6,806,446 | B1* | 10/2004 | Neale | H05B 1/0252 |
| | | | | 392/485 |
| 6,909,843 | B1* | 6/2005 | Fabrizio | F24H 9/2028 |
| | | | | 392/485 |
| 6,936,798 | B2* | 8/2005 | Moreno | F24H 9/2021 |
| | | | | 392/441 |
| 7,607,362 | B1* | 10/2009 | Brost | G01F 1/08 |
| | | | | 73/202 |
| 9,749,792 | B2* | 8/2017 | Klicpera | F16K 31/02 |
| 2003/0010135 | A1* | 1/2003 | Maxit | G01F 1/74 |
| | | | | 166/250.01 |
| 2003/0024324 | A1* | 2/2003 | Hani | G01F 1/10 |
| | | | | 73/861.77 |
| 2006/0027673 | A1* | 2/2006 | Fabrizio | F24H 1/102 |
| | | | | 237/2 A |
| 2010/0045471 | A1* | 2/2010 | Meyers | G01M 3/18 |
| | | | | 340/605 |
| 2012/0057857 | A1* | 3/2012 | Kenney | F24H 9/2028 |
| | | | | 219/494 |
| 2012/0063755 | A1* | 3/2012 | Lucker | F24H 9/2028 |
| | | | | 392/470 |
| 2013/0253872 | A1* | 9/2013 | Curtis | G01F 25/10 |
| | | | | 73/1.16 |
| 2015/0184890 | A1* | 7/2015 | Stebbins | F24D 17/0026 |
| | | | | 219/486 |
| 2016/0163177 | A1* | 6/2016 | Klicpera | F16K 31/05 |
| | | | | 137/59 |
| 2017/0052550 | A1* | 2/2017 | Akita | F24D 17/00 |
| 2020/0200399 | A1* | 6/2020 | Daniels | F24D 19/1051 |
| 2020/0217560 | A1* | 7/2020 | Zeitz | F24H 1/103 |
| 2021/0274597 | A1* | 9/2021 | Zeitz | F24H 9/2028 |
| 2021/0325086 | A1* | 10/2021 | Vega | F24H 1/124 |
| 2022/0099338 | A1* | 3/2022 | Rice | G05B 13/02 |

\* cited by examiner

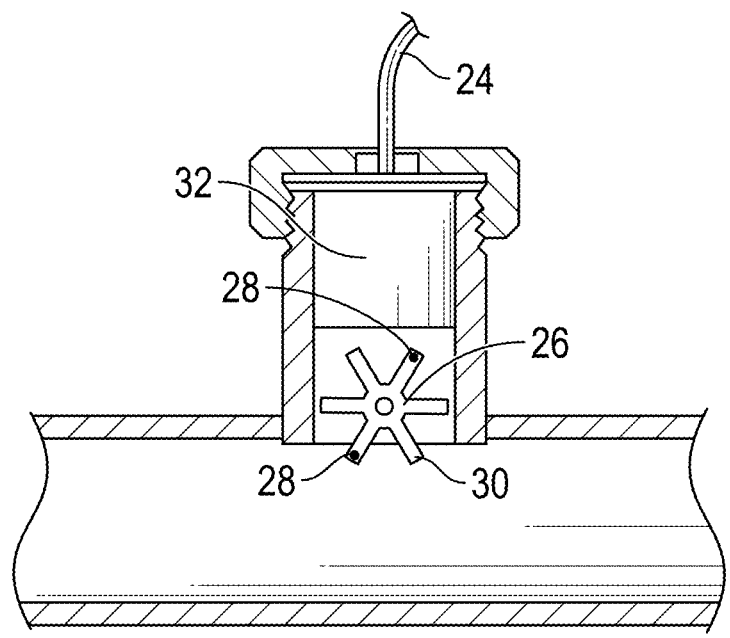
FIG. 2
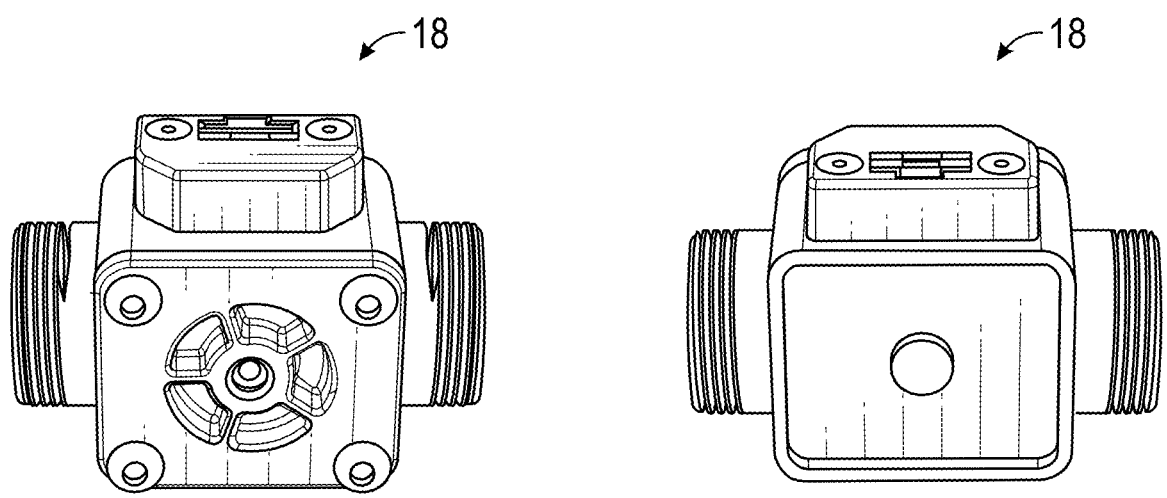
FIG. 3A  FIG. 3B

TANKLESS WATER HEATER WITH A HIGH-ACCURACY RESPONSE-CURVE FLOWMETER

PRIORITY

This application claims convention priority of U.S. Provisional Patent Application U.S. Ser. No. 63/145,636 entitled HIGH-ACCURACY RESPONSE-CURVED FLOWMETER filed Feb. 4, 2021, the teachings of which are incorporated herein in its entirety.

TECHNICAL FIELD

The present disclosure generally relates to tankless water heaters.

BACKGROUND

Typical tankless water heaters with an impeller flowmeter use a single K factor which is very inaccurate at low flow rates, such as under 1 gallon per minute. The measured flow rate of a single K factor flowmeter is non-linear particularly at low flow rates. Inaccurate flow rate readings at low flow rates lead to the tankless water heater not aiming on, or the heater turning on at too low a setting. Tank water heaters keep water heated at all times in a tank, and the heater does not have the capacity to heat the water quickly enough to satisfy potential demand.

BRIEF DESCRIPTION OF THE DRAWINGS

FIG. 2 is a cross section of the impeller positioned proximate a conduit with water flow;
FIG. 3A is a front view of the tankless flowmeter;
FIG. 3B is a rear view of the tankless flowmeter.

DETAILED DESCRIPTION

Figure 1A:
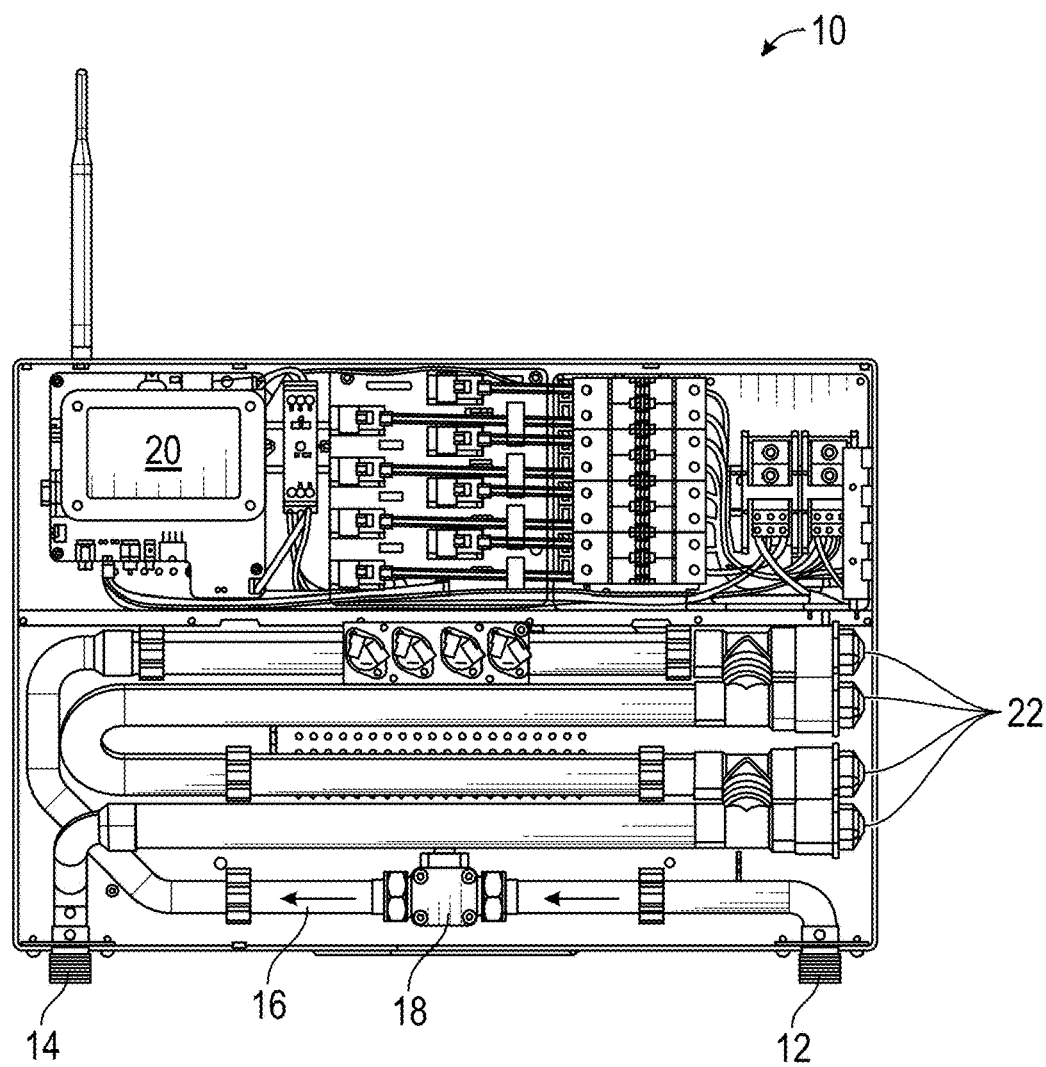
FIG. 1A is a front view of a tankless water heater utilizing an impeller flowmeter.

This disclosure includes a tankless water heater with an impeller flowmeter having multiple K factors significantly improving the accuracy of flowmeter readings, particularly at low water flow rates, such as under 1 gallon per minute Rather than use a single K factor impeller flowmeter in a tankless water heater that is particularly inaccurate at low flow rates, this disclosure provides an impeller flowmeter with multiple K factors to obtain precise flow rate readings to precisely control heating of the water at low flow rates. The flowmeter has an onboard memory with multiple K factors stored for a controller to access and read. These multiple K factors are established for flowrates across the entire dynamic range of the flowmeter at the time it is manufactured. Just enough K factors are determined to provide good curve fitting. The flowmeter onboard memory is programmed with the multiple K factors. As part of the tankless water heating application, the controller reads the multiple K factors from the flowmeter memory on startup and then calculates the K factor curve for the particular flowmeter installed, using a curve-fitting algorithm.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals, or light produced or supplied by one system element are imparted to another coupled element. Unless described otherwise. coupled elements or devices are not necessarily directly connected to one another and may be separated by intermediate components, elements or communication media that may modify, manipulate or carry the light or signals.

Potential disadvantages of a tank-based water heater include large size, because a substantial amount of water must be kept hot to satisfy potential demand, energy inefficiency since water is kept hot even when it may not be used for many hours, and water deposits due to large amounts of slowly moving water which may cause corrosion and leakage of the tank. In addition, despite being sized for expected use, it is not an uncommon occurrence for demand to exceed the supply, such as if many people take showers in a row, and thereby for the water heater to run out of hot water.

Tankless water heaters provide solutions to these potential problems of tank-based water heaters, as they are compact and heat water on demand, only when it is needed. Tankless water heaters typically use either natural gas or electricity to heat the water as it flows through, with a flowmeter providing important measurement and feedback data to a controller that regulates the applied power to one or more heating elements to heat the water. Conventional tankless water heater systems have a particularly significant challenge relating to fine levels of control of heated water if flow levels are low (below 1 gallon per minute).

This disclosure relates primarily to an electric heater based tankless water heater that incorporates an impeller flowmeter. Note that although this application discusses the subject disclosure primarily in terms of its use with a tankless water heater used to heat water, such as found in many homes, the subject disclosure is clearly usable with any of liquid heating system, in which high heat capacity of the flowing liquid causes need for a high-power heater whose power consumption must thereby be monitored and controlled precisely by measuring and monitoring the flow.

Flowmeters are devices for determining the flow rate of a medium (typically liquid or gas) through a delivery channel (typically a pipe). Many flowmeters have been developed over the years based on a range of methods for determining flow rate. These include but are not limited to mass flow meters, positive displacement flow meters electromagnetic flow meters, vortex flow meters, ultrasonic flow meters, turbine flow meters, and impeller flowmeters. Each of these flowmeters have characteristics and tradeoffs that make them suitable for the requirements of a given application.

Tankless water heater systems have requirements that make selection of a flowmeter particularly challenging. Flowmeters for tankless water heater systems must provide highly accurate water flow measurements across a wide dynamic range (from less than 0.2 GPM to greater than 5 GPM), quick response time to rapid changes in flow, and low pressure drop across the flowmeter even at the high end of its dynamic flow range. The flowmeters must be resistant to degradation over time and jamming by hardwater deposits and particulates inherent to the water piping environment. These characteristics must be achieved in a small physical space, at a relatively low financial cost. Typically, flow meters that have optimal characteristics are industrial in nature and not available at a price point that is practical for use in tankless water heater systems. Flow meters that are practical (low-cost turbine and impeller, are typically inaccurate, wear out too quickly, and/or produce high resistance to flow such that there is a significant pressure drop across the flow meter, thereby unacceptably restricting the flow of water.

Figure 1B:
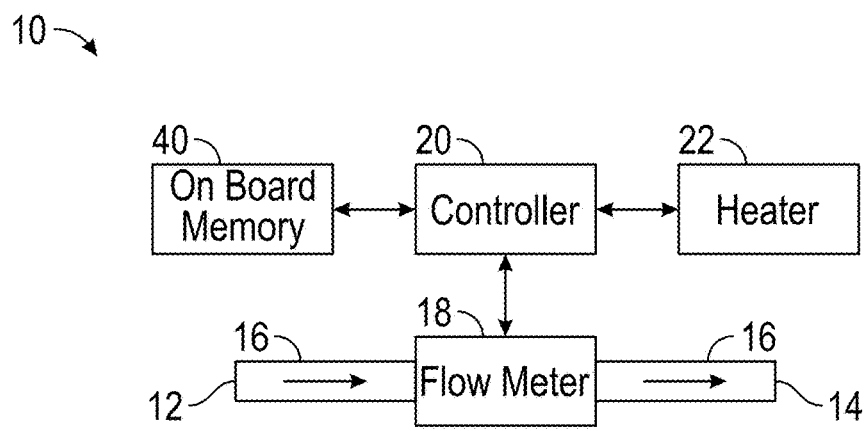
FIG. 1B is an electrical block diagram of the tankless water heater of FIG. 1A.

As shown in FIG. 1A, there is illustrated a tankless water heater 10 having a fluid input at 12, a fluid output at 14, a conduit 16 extending between the input 12 and the output 14, and an impeller flowmeter 18 in line with the conduit 16 and measuring a flow rate of a fluid, such as water or gas, passing through the conduit 16. The flowmeter 18 measures the fluid flow rate and generates flow rate signals that are sent to a controller 20. A heater 22 having a heating element is configured to controllably heat the water flow in the conduit 16 as a function of the measured flow rate, and a heat temperature setting. An electrical block diagram of the tankless water heater 10 is shown in FIG. 1B.

The impeller flowmeter 18, as shown in FIG. 2, generates a pulsing flow rate signal on data line 24 as the medium (water) flows through the conduit 16, causing an impeller 26 to spin on an axle. Magnets 28 embedded in impeller blades 30 rotate past a magnetic field sensor 32 (typically a hall-effect switch). The frequency of the electrical pulse signal produced is proportional to the rate of flow. The faster the flow, the higher the pulse frequency.

The number of pulses the flowmeter 10 produces for a given volume of water is referred to as the K factor for the flowmeter. For example, a flowmeter that produces 1800 pulses per gallon, would have a K factor of 1800.

The controller 20 receives the pulsing flow rate signal on data line 24 from the magnetic field sensor 32 and uses the information along with the K factor to calculate the flow rate of the fluid. The calculated flow rate is then used by the controller 20 to determine the response of the system. In the case of the tankless water heater 10, the calculated flow rate is used by the controller 20, along with the sensed inlet water temperature, to control the amount of power applied to heating elements of heater 22 to achieve the targeted outlet water temperature.

FIG. 3A illustrates a front view of the tankless water meter 18, and FIG. 3B illustrates a rear view of the tankless water meter 18.

Figure 4:
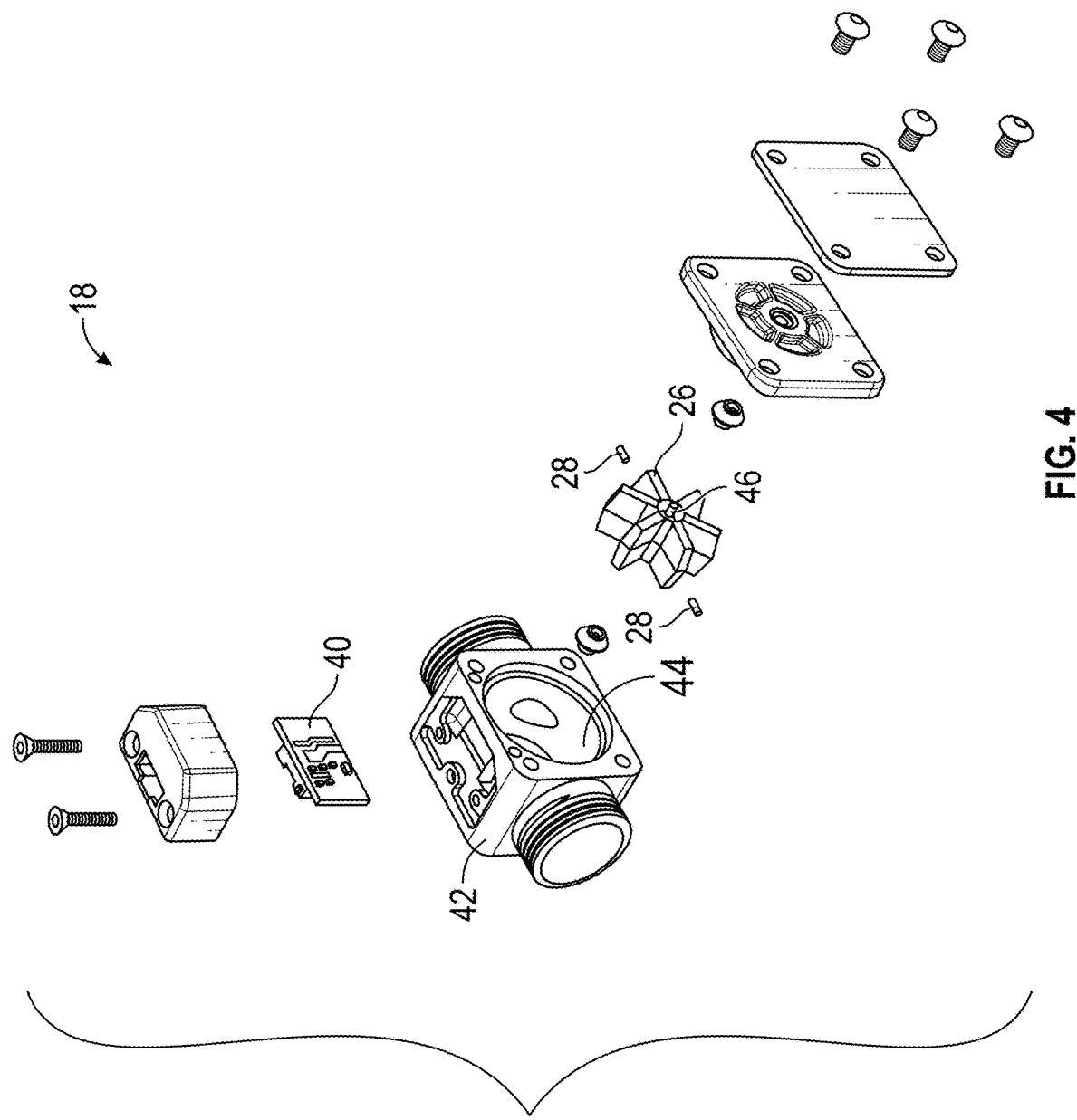
FIG. 4 is an exploded view of the flowmeter.

Referring to FIG. 4, there is illustrated an exploded view of the flowmeter 18. Two important features are a neutral buoyancy impeller 26, and an onboard memory 40 containing multiple calibration K factors specific to each flowmeter 18 produced, for use in a curve-fitted response by the controller 20. The flowmeter 18 has a body 42 and a bore 44 therein that receives the impeller 26.

Figure 5:
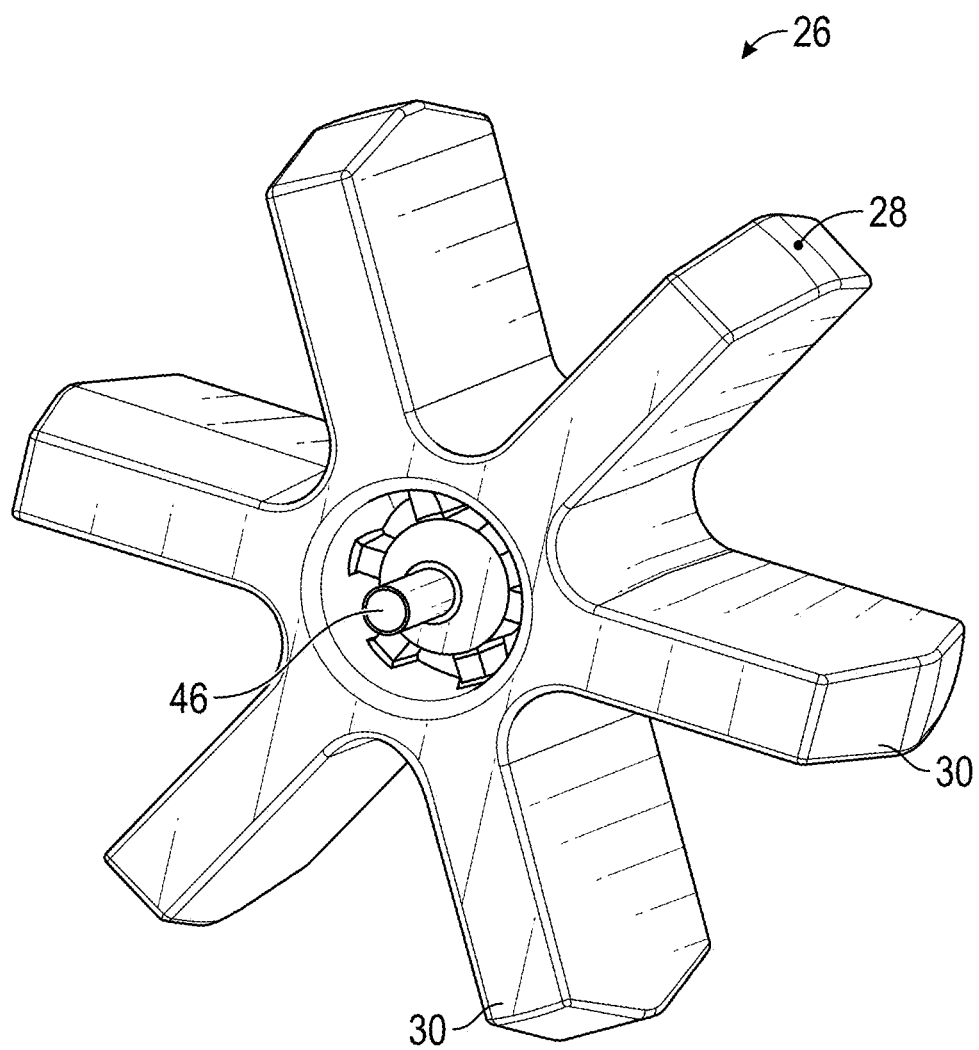
FIG. 5 is an illustration of the neutrally buoyant impeller.

The neutral buoyancy impeller 26, as shown in FIG. 5, is neutrally buoyant in the fluid it measures, such as water, and provides superior sensitivity and responsiveness at the very low flow end of the flowmeter dynamic range. A significant factor that limits low flow performance in impeller flowmeters is friction. At low flow rates (typically flowrates less than 1 GPM for tankless water heater applications), friction becomes an increasing factor in the accuracy and responsiveness of the flowmeter. In an impeller flowmeter, the frictional force is proportional to the weight of the impeller assembly in the particular medium (water in a tankless water heater), including the weight of an impeller shaft 46 and the magnets 28 embedded in the impeller blades 30. The weight of the impeller 26 also acts as a resistance to flow, thus increasing the pressure drop across the flowmeter 18 (an undesirable effect).

Given the direct relationship between the weight of the impeller 26, the amount of friction, and resistance to flow, one may conclude that it is obvious that the lighter the impeller, the better the flowmeter will perform. However, this is not the correct conclusion. Since the impeller 26 is submerged in the medium, if the impeller 26 is too light it will be buoyant in the medium and the impeller shaft will press upwards against the bore 44 it rotates within. Thus, although not at all obvious, the ideal impeller design is one where the cumulative weight of all the components of the impeller (wheel, shaft, embedded magnets) is equal to the weight of the equivalent volume of the medium, such as water. In other words, the net density of the impeller 26 is equal to the density of the water in which it is immersed, resulting in the buoyant force balancing the force of gravity. The impeller achieves the equivalent of weightlessness, thus minimizing the force of friction.

In the case of the tankless water heater flowmeter 18, to achieve such a neutral buoyant design the size and materials of the impeller 26 components must be traded off and carefully adjusted until the net density of the impeller 26 is equivalent to the net density of water displaced by the impeller.

To illustrate the concept further, an example impeller design is listed in Table 1. The water weight equivalent for the volume occupied by the example impeller shown in FIG. 5 is calculated at 3.3 grams. Two example impeller designs were designed from different materials as listed in Table 1.

TABLE 1

Impeller Design Examples

| Impeller Design | Wheel Material | Wheel Weight (grams) | Shaft Material | Shaft Weight (grams) | Magnet Material | Magnet Weight (grams) | Total Weight (grams) |
| --- | --- | --- | --- | --- | --- | --- | --- |
| A | Acetal Co-polymer | 4.54 | SS304 | .3 | Neodymium | .1 | 4.85 |
| B | Polypropylene | 2.9 | SS304 | .3 | Neodymium | .1 | 3.3 |

As seen in Table 1, it can be observed that Impeller Design B achieves the optimal neutral buoyancy matching the 3.3 grams of water weight equivalent for the impeller volume, while Design A is negatively buoyant.

Both impeller designs were tested to verify the performance factors: pressure drop, minimum activation, and minimum. Q. Minimum activation is the flowrate where the impeller first begins to rotate, although rotation may be hesitant and irregular. Minimum Q is the flowrate where the impeller rotates in a regular steady periodic manner, such that it is useful for reliable flow measurements and calculations. Performance results comparison is as shown in Table 2.

TABLE 2

Impeller Design Performance Results

| Impeller Design | Pressure Drop (PSI) at 5 GPM flowrate | Minimum Acitivation (GPM) | Minimum Q (GPM) |
|---|---|---|---|
| A | 7.9 | .08 | .095 |
| B | 6.9 | .05 | .08 |

As seen in Table 2, it can be observed that Impeller Design B performance is clearly superior to that of Design A. The neutral buoyancy design achieves the lowest pressure drop, the lowest activation flowrate and the lowest minimum Q. The end result, from a flowmeter design perspective, is a flowmeter that uses the Impeller Design B will have an extended low flow range at a reduced resistance to flow (lower PSI drop).

Figure 6:
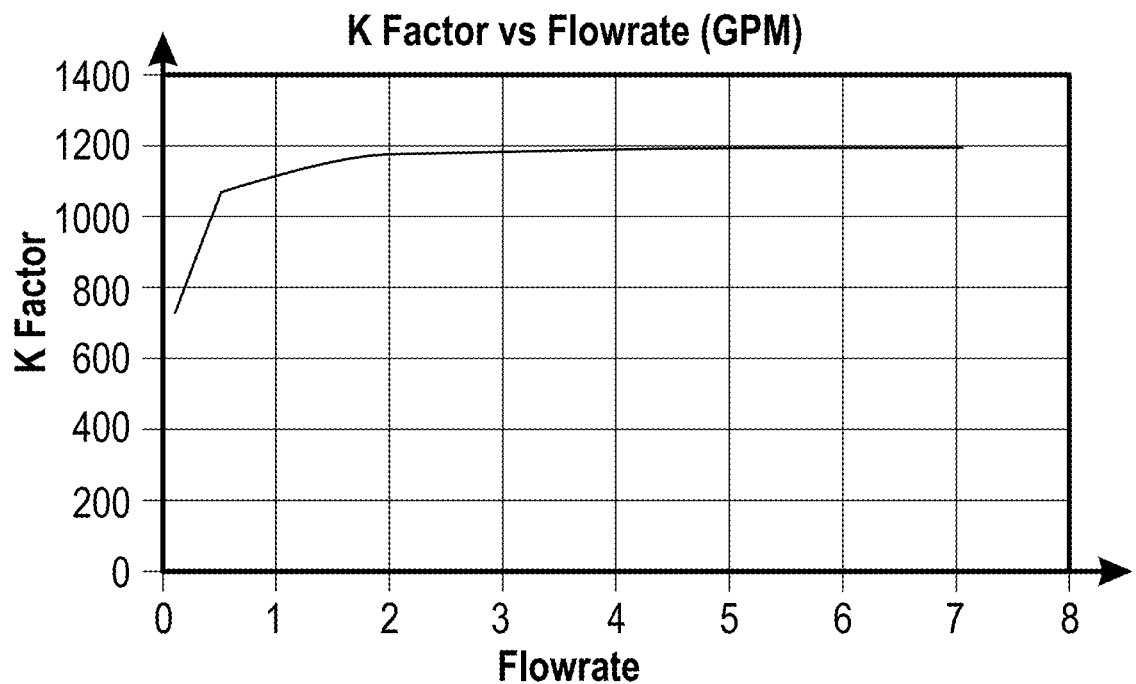
FIG. 6 is a graph of the K factor vs. flowrate.

The second innovation is the onboard multiple K factor memory 40. Present commonly available flowmeters are provided with a single K factor, where the K factor is the number of pulses a flowmeter produces for a given volume of water by the manufacturer. This single K factor is intended to be used in the end application to calculate the flow rate across the entire dynamic range of the flowmeter. The K factor versus flowrate for flowmeters remains fairly constant across the middle of the flowmeter dynamic range. However, at the low end of the dynamic range, the K factor begins to drop such that the calculated flowrate becomes more and more inaccurate. FIG. 6 shows how the K factor varies vs flowrate for a flowmeter with a single K factor.

For the flowrate range between 2 and 7 gallon per minute (GPM), the K factor remains fairly constant. However, as the flowrate drops below 2 GPM, the factor begins to drop off in a non-linear way. This inaccuracy in the K factor at the low end of the dynamic range, especially under 1 GPM, is particularly problematic for tankless water heater applications, as the controller relies on the accuracy of the calculated flow rate, along with the sensed inlet water temperature, to control the amount of power applied to the heating elements of heater 22 to achieve the targeted outlet water temperature. At low flow rates, it becomes particularly challenging for the controller to respond properly to changes in flowrates. In a flowmeter with a single K factor, the flowmeter may not measure any flow rate when the flowrate is under 0.5 GPM due to friction, losses, and other variables. In such a case, the heater would not be activated at all and thus the water would not be heated.

An improvement in this disclosure is a means for the flowmeter 18 having the onboard memory 40 with multiple K factors stored for the controller 20 to access and read. These multiple K factors are established for flowrates across the entire dynamic range of the flowmeter 18 at the time it is manufactured. Just enough K factors are determined to provide good curve fitting. The flowmeter onboard memory 40 is programmed with the multiple K factors. As part of the tankless water heating application, the controller 20 reads the multiple K factors from the flowmeter memory 40 on startup, and then calculates the K factor curve for the particular flowmeter installed, using a curve-fitting algorithm.

Figure 7:
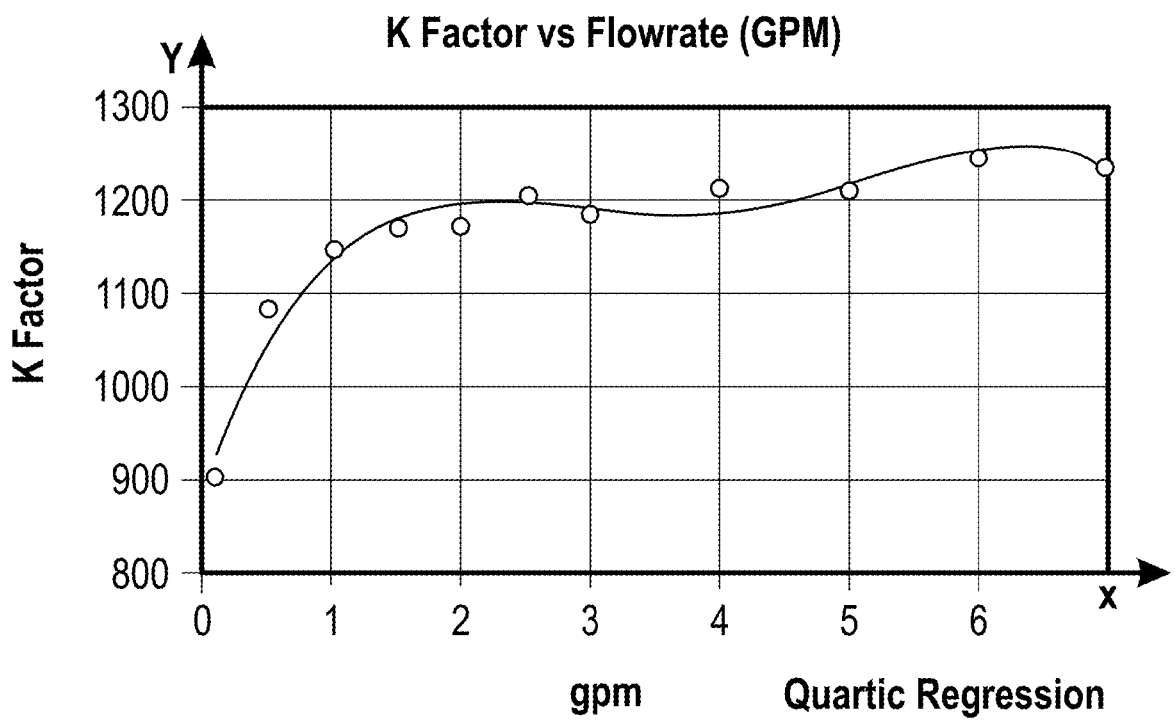
FIG. 7 is a graph of the K factor curve.

FIG. 7 shows how a flowmeter that would normally be assigned a single K factor of 1200 has multiple K factors determined across the dynamic range of the flowmeter according to this disclosure. In an example, 11 flowrates were tested, and the associated K factors determined. These 11 K factors, are then used to establish an accurate K factor curve, as shown in FIG. 7. In this example, quartic regression was used to establish the curve fit to the 11 K factor points read from flowmeter memory 40, where: $y=732.5489 +602.985*x-269.5228*x^2+48.55532*x^3-2.998436*x^4$.

For example, referring to FIG. 7, at 0.2 GPM, the K factor used is 960 and is used to determine an accurate flowrate. At 6.4 GPM, the K factor is 1260. Thus, the flowmeter accuracy is maintained across the entire dynamic range of flowrates. In this example, the K factor 960 at 0.2 GPM is at least 20% less than the 1260 K factor at 6.4 GPM. In particular, at the lowest flowrates, critical accuracy is achieved for calculating the correct amount of power to apply to the heating elements of heater 22 to optimally achieve the targeted outlet water temperature. This tankless water heater 10 has a significantly improved system response and performance.

Figure 8:
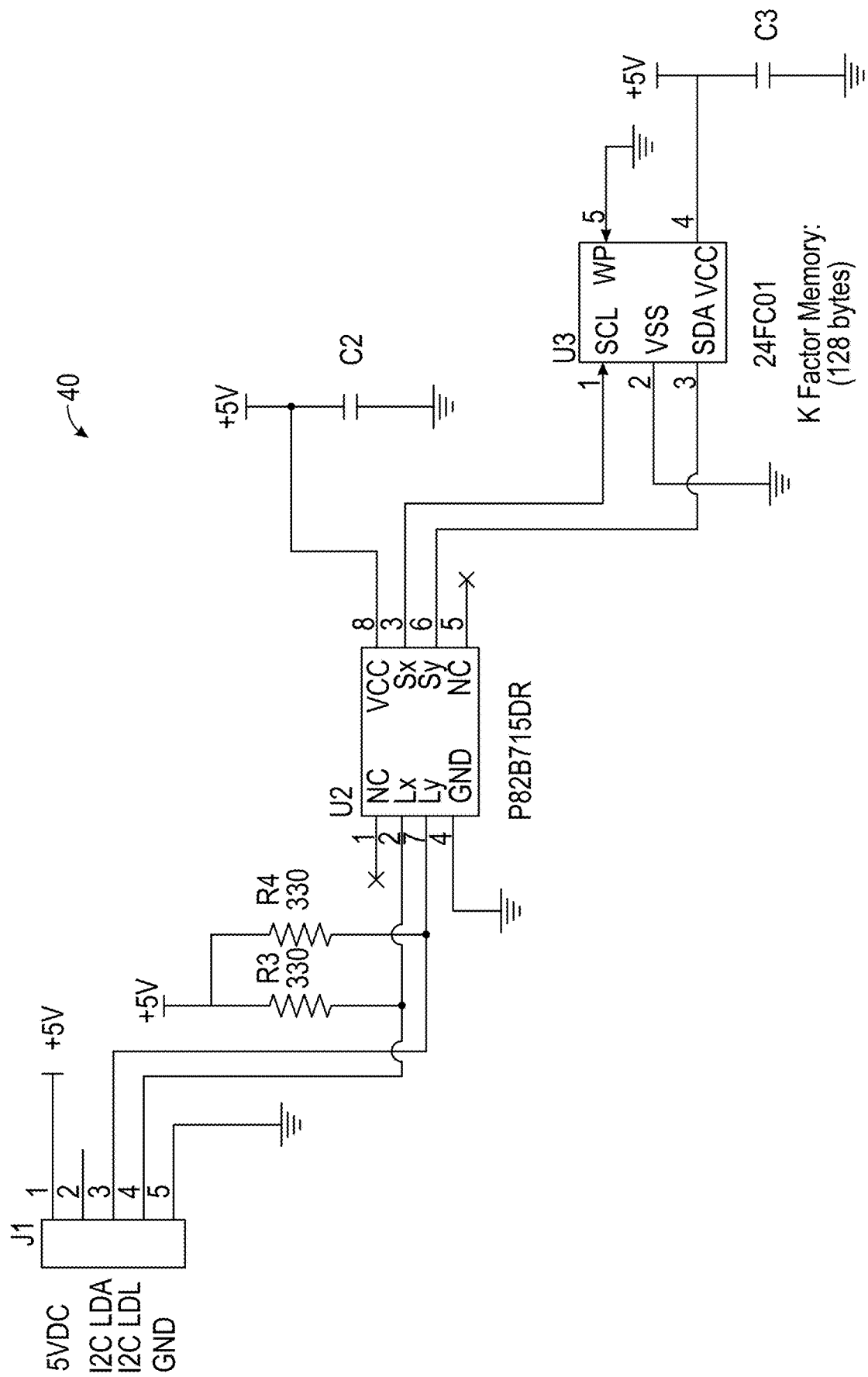
FIG. 8 is a schematic of the flowmeter onboard, memory circuit.

FIG. 8 is an illustration of an example flowmeter onboard memory circuit 40 design arranged as a simple serial EEPROM, U3 (24FC01) accessible by the controller 20 via a standard serial interface such as I2C bus. In this example, an I2C bus extender circuit, U2, (P82B715DR) is used to allow the flowmeter 18 to be placed some distance away from the controller 20, while maintaining signal integrity.

Figure 9:
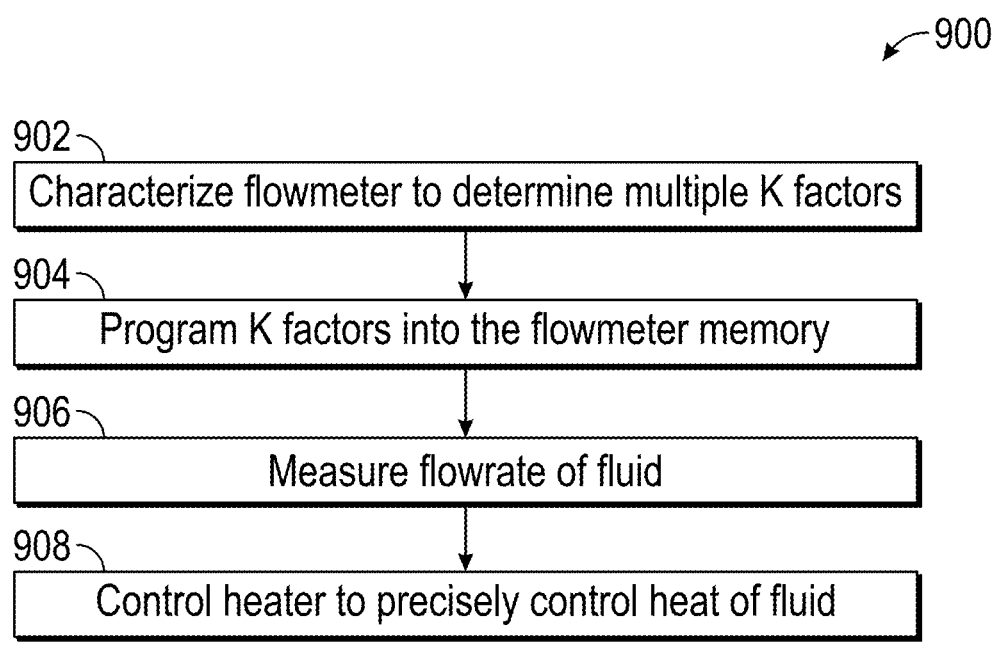
FIG. 9 is a method of operating the flowmeter.

Referring to FIG. 9, there is illustrated a method 900 for programming and operating the flowmeter 18.

At step 902, the flowmeter 18 is electronically characterized at the factory to determine multiple K factors across an operating range of flowrates. In an example, 11 K factors are determined as previously described. This characterization determines K factors that are unique to each flowmeter 18 and takes into account the specific features of each flowmeter. Even with uniform manufacturing techniques, each flowmeter has unique features.

At step 904, the determined multiple K factors are programmed into the flowmeter memory 40 of the flowmeter 18. An example curve of the determined multiple K factors are shown in FIG. 7.

At step 906, the controller 20 uses flowmeter 18 to measure the flow rate of fluid communicating through the conduits 16 from input 12 to output 14. This measured flow rate is communicated as data signals via data line 24, and the data signals may be a series of pulses as previously described. Other types of data signals may be provided to controller 20, and limitation to pulses is not to be inferred.

At step 908, the controller 20 of the flowmeter 18 controls the power delivered to the heating elements of heater 22 to precisely control the heating of the fluid. The heating of the fluid is precise at the low end of the flow rate such that the water temperature of the fluid delivered from output 14 is accurate and as desired.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring, or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim Rather, as the following claims reflect, the subject matter to be protected lies in less than all features of any single disclosed example. Thus, the following claims are hereby incorporated into the Detailed Description, with each claim standing on its own as a separately claimed subject matter.

What is claimed is:

1. A tankless water heater, comprising:
   a flowmeter having a body with an impeller disposed in the body, the flowmeter configured to determine a flowrate of a fluid communicating through the body:
   a heater configured to heat the fluid communicating through the body;
   a memory configured to store multiple K factors of the flowmeter; and
   a controller configured to use the multiple K factors stored in the memory to calculate a
   K factor curve of the flowmeter wherein the controller is configured to control the heating of the fluid as a function of the K factor curve.

2. The tankless water heater as specified in claim 1, wherein the controller is configured to selectively control power delivered to the heater to heat the fluid as a function of the K factor curve.

3. The tankless water heater as specified in claim 2, wherein one said K factor correlated to a flowrate of under 1 gallon per minute is at least 20% lower than a second said K factor correlated to a flowrate of at least 6 gallons per minute.

4. The tankless water heater as specified in claim 2, wherein the impeller is configured to be neutrally buoyant in water.

5. The tankless water heater as specified in claim 4, wherein the impeller comprises blades and at least one magnet disposed on at least one of the blades.

6. The tankless water heater as specified in claim 5, further comprising a sensor configured to detect the at least one magnet and provide a sensor signal to the controller.

7. The tankless water heater as specified in claim 1, wherein the controller is configured to use at least ten K factors.

8. A method of operating a tankless water heater comprising a flowmeter having a body with an impeller disposed in the body, the flowmeter configured to determine a flowrate of a fluid communicating through the body, a heater configured to heat the fluid communicating through the body, a memory configured to store multiple K factors of the flowmeter, and a controller configured to use the multiple K factors stored in the memory to calculate a K factor curve of the flowmeter and control the heating of the fluid as a function of the K factor curve, comprising: the controller retrieving the multiple K factors from the memory; and the controller determining the flowrate of the fluid communicating through the body.

9. The method as specified in claim 8, wherein the controller selectively controls power delivered to the heater to heat the fluid as a function of the K factor curve.

10. The method as specified in claim 9, wherein one said K factor correlated to a flowrate of under 1 gallon per minute is at least 20% lower than a second said K factor correlated to a flowrate of at least 6 gallons per minute.

11. The method as specified in claim 9, wherein the impeller is configured to be neutrally buoyant in the fluid.

12. The method as specified in claim 11, wherein the impeller comprises blades and at least one magnet disposed on at least one of the blades.

13. The method as specified in claim 12, further comprising a sensor configured to detect the at least one magnet and provide a sensor signal to the controller.

14. The method as specified in claim 8, wherein the controller uses at least ten K factors.

\* \* \* \* \*